United States Patent Office 3,425,618
Patented Feb. 4, 1969

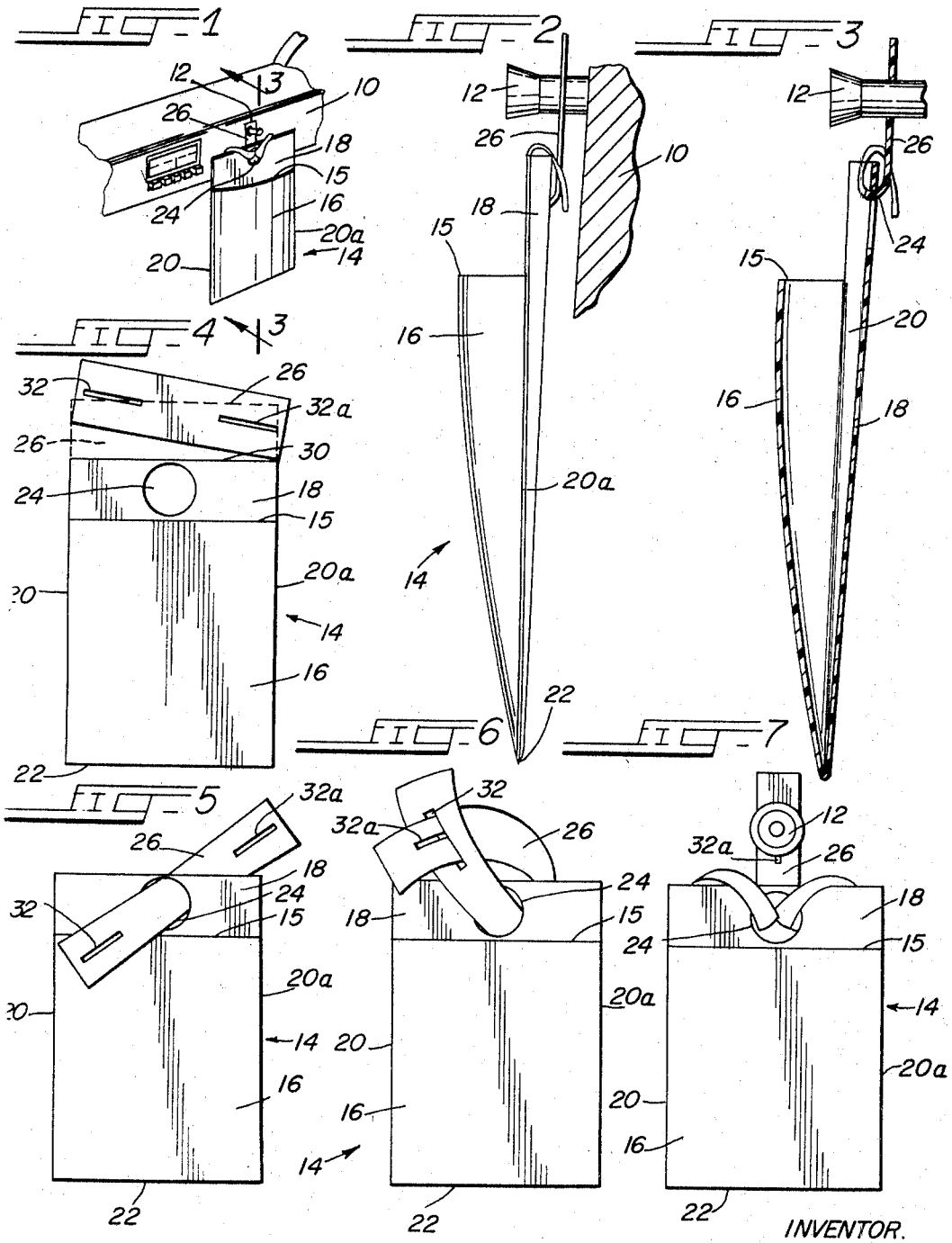

3,425,618
LITTER BAG
Robert Cohen, Bellmore, N.Y., assignor, by mesne assignments, to Comet Packaging Corporation, Bronx, N.Y., a corporation of Delaware
Filed Dec. 4, 1967, Ser. No. 687,710
U.S. Cl. 229—53
Int. Cl. B65d 33/14
2 Claims

ABSTRACT OF THE DISCLOSURE

A disposable litter bag comprising a thin plastic open-ended envelope having front and rear panels, the rear panel extending upwardly of the front panel and having an opening therein and a separable strip which, upon separation from said rear panel and insertion through said opening, forms a sling for suspending the bag at a position well below a supporting object to preclude soiling of the supporting object during use of the litter bag.

---

This application relates to containers for the collection and temporary retention of litter, discarded articles, and refuse. More specifically, it relates to an improved litter bag for use in automobiles, boats, airplanes, and trains as well as in institutions, restaurants, and public and semi-public places.

The problem of public littering is well-recognized by municipal and state governments which frequently provide substantial fines as penalties for discarding trash on public streets and highways. Patrons of drive-in restaurants and outdoor theaters are known to discard food containers, wrappers, napkins and similar articles by dropping them out of windows, thereby littering the immediate and surrounding vicinity, creating blight and serious health hazards.

Indoor establishments such as cafeterias, hospitals, offices, schools and factories are faced with an equally serious problem of littering.

It is an object of this invention to provide an improved litter bag for the collection of refuse for use in automobiles and other vehicles as well as in a variety of indoor and outdoor locations.

It is a further object of this invention to provide an inexpensive disposable litter bag having an attractive appearance, which litter bag is convenient and sanitary in use, and which may be attached to or suspended from a variety of suporting objects without subjecting the supporting objects to soiling.

A particular feature of this invention is a detachable sling-forming strip which permits suspension of the litter bag well below supporting bjects, such as automobile door handles, dashboard knobs, and similar projecting supports which would otherwise be subject to soiling by contact with trash being inserted into the bag.

A related feature of the invention is that it precludes soiling of vehicle walls, upholstery and other surfaces behind or just above the bag.

These, and other objects and features of the invention will become apparent from the following description, taken in conjunction with the drawing wherein:

FIGURE 1 is a perspective view showing the litter bag as used suspended from a knob of an automobile instrument panel;

FIGURE 2 is a side elevational view of the litter bag suspended from a knob of the automobile instrument panel;

FIGURE 3 is a cross sectional view of the litter bag taken along line 3—3 of FIGURE 1;

FIGURE 4 is a front elevational view of the litter bag showing a detachable strip which forms a sling used for hanging the bag; and FIGURES 5, 6 and 7 are front elevational views of the litter bag showing the use of the detachable strip to form a sling for hanging the bag on a knob or other projection.

Referring more specifically to the drawings, there is shown in FIGURE 1 an automobile instrument panel or dashboard 10 from which there projects a control knob 12. Suspended from the knob 12 is a litter bag 14 made of thin sheet plastic or paper and comprising a front panel 16 and a rear panel 18. The front and rear panels are joined at both side edges 20 and 20a and at their lower edges 22 to form an open-ended envelope. The rear panel 18 extends upwardly of the upper edge 15 of the front panel 16 to form a protective upper portion or apron. A hole 24 is formed in the upper portion of the rear panel 18. A band-like sling formed from a detachable strip 26 is looped through the hole 24 to suspend the bag 14 from the knob or projection 12. The construction of the bag is more clearly illustrated in FIGURES 2 and 3.

Referring to FIGURE 4, the litter bag is shown prior to being suspended from an object. The upper portion 26 of the rear panel 18 is indentured or otherwise weakened along a line 30 which enables it to be detached to form a strip 26 usable as a sling for suspending the bag. The strip 26 is provided with slots 32 and 32a. As shown in FIGURES 5, 6 and 7, the strip 26, after detachment, is inserted through the hole 24. The end of the strip 26 containing slot 32a is inserted through slot 32, and then slot 32a is looped over the projecting knob 12 or other suporting object.

The entire bag 14 may consist of thin flexible plastic or paper, and may be produced from a single rectangular sheet of such material by folding the sheet to form the lower edge 22 and heat sealing, gluing, or otherwise joining the edges 20 and 20a of the front panel 16 and the rear panel 18. The indentured or weakened line 30, the hole 24, and the slots 32 and 32a may be formed in the sheet material either prior to or after it is folded and sealed to form the open-ended envelope.

The litter bag may be used in a variety of ways depending upon the location of use and preference of the user. It may be suspended by the sling 26, as described above, or by inserting a suporting object such as a knob, hook or door handle through the hole 24. When used in either manner, the upper portion of the rear panel 18 forms a protective apron to prevent soiling of the wall, instrument panel, or upholstery just above the opening of the litter bag. When the bag is suspended by means of the sling 26, it hangs an appreciable distance below the projecting supporting object so as to preclude soiling of the projecting supporting object by litter or trash being inserted into the bag.

What is claimed is:

1. A disposable bag for containing litter, said bag comprising:

a front panel and a rear panel joined at three coextensive marginal edges to form an open-ended envelope, said rear panel including a portion extending longitudinally of an upper extremity of said front panel, said portion having formed therein a hole for receiving therethrough a bag-supporting element, a marginal portion of said rear panel being weakened along a transversely extending line to form a detachable strip, and said strip having formed therein first and second through-openings whereupon, upon detachment of said strip from said bag, said strip is adaptable for insertion through said hole and through one of said through-openings to form sling means for suspending said bag at a position well below said bag-supporting element to preclude soiling of said bag-supporting element during insertion of litter into said bag.

2. The invention set forth in claim 1, wherein said first and second through-openings are slots formed in said strip.

References Cited

UNITED STATES PATENTS

| | | | |
|---|---|---|---|
| 1,529,381 | 3/1925 | Townsend | 229—74 |
| 2,973,131 | 2/1961 | Mead et al. | 229—66 |
| 3,079,066 | 2/1963 | Roop | 229—62 |
| 3,186,626 | 6/1965 | Shvetz | 229—62 |

DAVID M. BOCKENEK, *Primary Examiner.*

U.S. Cl. X.R.

229—62, 66